(12) United States Patent
Park et al.

(10) Patent No.: US 11,256,407 B2
(45) Date of Patent: Feb. 22, 2022

(54) SEARCHING METHOD AND APPARATUS THEREOF

(71) Applicant: SAMSUNG SDS CO., LTD., Seoul (KR)

(72) Inventors: Jin Hee Park, Seoul (KR); Dae Kyoung Han, Seoul (KR); Ji Yeon Jeong, Seoul (KR); Bo Ri Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/668,159

(22) Filed: Oct. 30, 2019

(65) Prior Publication Data

US 2020/0133454 A1   Apr. 30, 2020

(30) Foreign Application Priority Data

Oct. 30, 2018 (KR) .................. 10-2018-0131199

(51) Int. Cl.
*G06F 3/0486* (2013.01)
*G06F 16/9532* (2019.01)
*G06F 16/9538* (2019.01)
*G06F 3/0488* (2013.01)
*G06F 3/04883* (2022.01)

(52) U.S. Cl.
CPC ........ *G06F 3/0486* (2013.01); *G06F 3/04883* (2013.01); *G06F 16/9532* (2019.01); *G06F 16/9538* (2019.01)

(58) Field of Classification Search
CPC ............... G06F 3/0486; G06F 3/04883; G06F 3/04842; G06F 3/0482; G06F 16/9532; G06F 16/9538; G06F 16/9535; G06F 16/95; G06F 3/04817; H04M 1/72403; H04M 1/72469
See application file for complete search history.

(56) References Cited

U.S. PATENT DOCUMENTS

| 7,181,438 | B1* | 2/2007 | Szabo | G06F 21/6245 |
| 9,141,705 | B2* | 9/2015 | Lai | G06F 16/335 |
| 2006/0136833 | A1* | 6/2006 | Dettinger | G06F 3/0486 715/769 |
| 2008/0074391 | A1* | 3/2008 | Coe | G06F 3/038 345/163 |
| 2014/0181650 | A1* | 6/2014 | Polubinski | G06F 3/0482 715/702 |

(Continued)

FOREIGN PATENT DOCUMENTS

KR    10-2011-0012227 A    2/2011

*Primary Examiner* — Amy M Levy
(74) *Attorney, Agent, or Firm* — The PL Law Group, PLLC

(57) ABSTRACT

Provided are search methods and apparatuses capable of defining a search result screen in a simple and easy way. According to an aspect of the present disclosure, there is provided a search method performed by a computing device. The search method comprises receiving a search term and automatically displaying a first graphic user interface (GUI) object configured to receive a search result screen configuration scheme in response to a first user input for the received search term without an additional user input after the first user input. The first unit input is a user input other than a user input editing the search term.

11 Claims, 13 Drawing Sheets

(56) References Cited

U.S. PATENT DOCUMENTS

| | | | |
|---|---|---|---|
| 2015/0012527 A1* | 1/2015 | Hewitt | G06F 3/0481 707/722 |
| 2015/0046437 A1* | 2/2015 | Connors | G06F 16/358 707/723 |
| 2015/0169147 A1* | 6/2015 | Pais | G06F 3/0482 715/781 |
| 2016/0125498 A1* | 5/2016 | Setty | G06F 16/248 705/26.63 |
| 2016/0188658 A1* | 6/2016 | Thomson | G06F 3/04883 707/766 |
| 2017/0017724 A1* | 1/2017 | MacGillivray | G06F 16/9535 |
| 2017/0177706 A1* | 6/2017 | Ben-Tzur | G06F 16/248 |
| 2017/0277364 A1* | 9/2017 | Roach | G06F 3/017 |
| 2017/0322971 A1* | 11/2017 | Seshadri | G06F 16/9038 |
| 2019/0007435 A1* | 1/2019 | Pritzkau | G06F 3/0482 |
| 2019/0130041 A1* | 5/2019 | McKee | G06F 3/0486 |
| 2019/0197078 A1* | 6/2019 | Nishizawa | G06F 3/0482 |
| 2019/0205761 A1* | 7/2019 | Wu | G06F 16/3344 |
| 2020/0065886 A1* | 2/2020 | Leon | G06F 3/04842 |

* cited by examiner

SEARCHING METHOD AND APPARATUS THEREOF

PRIORITY

This application claims the benefit of Korean Patent Application No. 10-2018-0131199, filed on Oct. 30, 2018, in the Korean Intellectual Property Office, the disclosure of which is incorporated herein by reference in its entirety.

BACKGROUND

1. Field of the Disclosure

The present disclosure relates to a search method and apparatus, and more particularly, to a method and apparatus for providing a search result screen while a search method is performed through the Internet.

2. Description of the Related Art

An "Internet search" has become a type of method for modern people to obtain information by ensuring reliability along with convenience. However, there is a problem in that the Internet, which is called a sea of information, has a vast amount of information and not all the information is desired by a user.

In order to solve this problem, search service providers categorize and provide search results. However, even in this case, a user should enter keyword information, acquire detail information and categories for classification, and then select a desired category.

That is, when a user enters a target search term and then selects a desired category from a search result shown on a separate screen, the user may acquire information provided through a separate screen.

Such a search service has a problem in that a desired search result cannot be provided to a user at once.

SUMMARY

Aspects of the present disclosure provide a search method and apparatus capable of defining a search result screen in a simple and easy way.

Aspects of the present disclosure also provide a search method and apparatus capable of providing detailed search conditions (second and tertiary search conditions), as well as a search keyword, through a single search window and receiving an input through the single screen.

Aspects of the present disclosure also provide a search method and apparatus capable of analyzing a user's search pattern and providing a user-customized search result.

It should be noted that objects of the present invention are not limited to the above-described objects, and other objects of the present invention will be apparent to those skilled in the art from the following descriptions.

According to an aspect of the present disclosure, there is provided a search method performed by a computing device. The search method comprises receiving a search term and automatically displaying a first graphic user interface (GUI) object configured to receive a search result screen configuration scheme in response to a first user input for the received search term without an additional user input after the first user input. The first unit input is a user input other than a user input editing the search term.

According to an embodiment, the displaying of the first GUI object may comprise obtaining a primary search result for the search term in response to the first user input and determining an entry for configuring the first GUI object and an item for the entry on the basis of the primary search result and the primary search result is not displayed. The search method may further comprise detecting a second user input for the first GUI object and additionally displaying a second GUI object configured to receive the search result screen configuration scheme in detail in response to the detected second user input. The displaying of the first GUI object may further comprise further displaying, adjacent to the displayed first GUI object, numerical information indicating at least one of the number of searches for each entry and the number of searches for each item of the primary search result.

According to an embodiment, the first GUI object may be composed of one or more entries and an item for each entry, the first user input may be a long tap or a long left-button click, and the search method may further comprise treating a first item as being selected when a second user input of moving to the first item through dragging while the first user input is maintained is detected. The search method may further comprise automatically displaying a search result screen configured to reflect the first item without an additional user input after release of the first user input in response to the release of the first user input. The treating of the first item as being selected may comprise treating the first item and a second item as being selected in response to a third user input of moving from the first item to the second item through dragging while the first user input is maintained.

According to an embodiment, the first GUI object may be composed of an entry pre-defined irrespective of the received search term and an item pre-defined for the entry irrespective of the received search term.

According to an embodiment, the first GUI object may be composed of one or more entries and an item for each of the entries and the item for each of the entries is displayed differentially from other items on the basis of a history of the items for the entries selected by a user of the computing device.

According to an embodiment, the first GUI object may be composed of one or more entries configured to define a search result screen and an item for each of the entries and the one or more entries constituting the first GUI object are selected from among a plurality of candidate entries on the basis of a history of the items for the entries selected by a user of the computing device.

According to an embodiment, the first GUI object may be composed of one or more entries configured to define a search result screen and an item for each of the entries and the item for each of the entries is displayed differentially from other items on the basis of a category of a hit item selected from the search result screen by a user of the computing device.

According to another aspect of the present disclosure, a computing device comprising an input device configured to receive a user input, a network interface configured to transmit a search request including a search term to a search server, a memory configured to load a plurality of instructions and a processor configured to execute the plurality of instructions loaded in the memory is provided. The plurality of instructions comprises instructions for automatically displaying a first graphic user interface (GUI) object for receiving a search result screen configuration scheme in response to a first user input for the search term without an additional user input after the first user input. The first user input may be a user input other than a user input editing the search term.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION OF THE EMBODIMENTS

Figure 1:
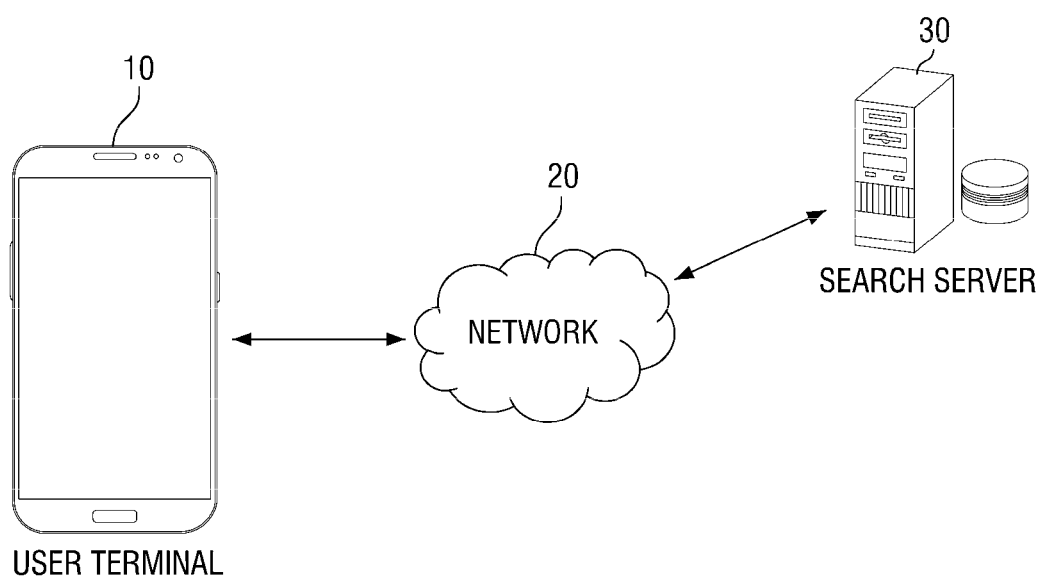
FIG. 1 is a block diagram of a search system according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, some embodiments of the present invention will be described in detail with reference to the accompanying drawings.

The configuration and operation of a search system according to an embodiment of the present invention will be described below with reference to FIGS. 1 and 2.

Figure 2:
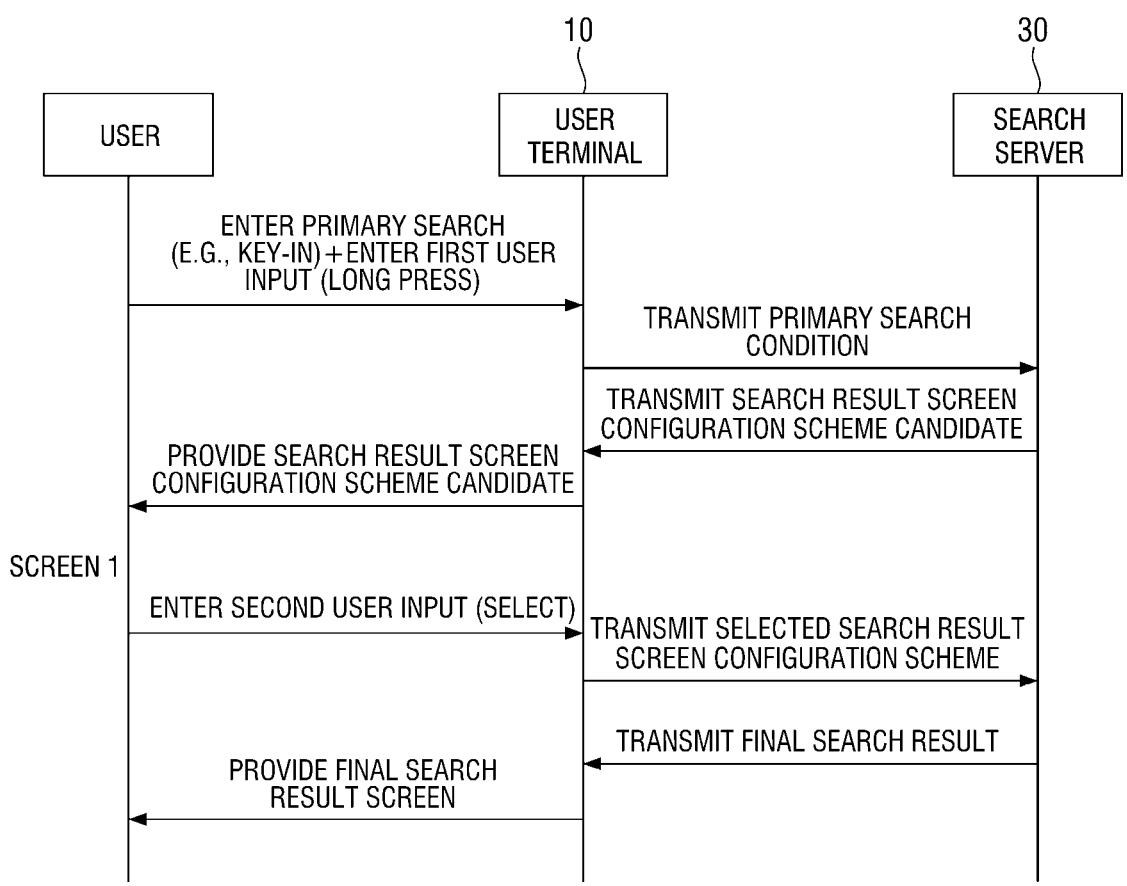
FIG. 2 is a sequence diagram schematically illustrating operation of the system of FIG. 1.

Referring to FIG. 1, the search system according to this embodiment may include a user terminal 10 and a search server 30. However, this is merely an exemplary embodiment for achieving an object of the present invention, and some elements may be added or removed as necessary. Each element will be briefly described below.

The search system according to this embodiment includes one or more search servers 30. Here, the search server may be a notebook, a desktop, or the like, but it is preferable that the search server should be implemented as a high-performance server computing device. However, the present invention is not limited thereto, and the search server 30 may include any apparatus equipped with computing means and communication means.

The search server 30 obtains a search condition for a search result screen configuration scheme, performs a search according to the search condition, and transmits a search result corresponding to the search.

The search condition refers to various conditions indicating desired information. For example, the search condition includes a search term expressed as a keyword or the like, a category corresponding to a search term, information such as an image, a video, a general class, and the like.

Here, the search term indicating a keyword or the like refers to a primary search condition, a category and class including a search term refer to a secondary search condition, and a condition forming a sub-concept of the secondary search condition refers to a tertiary search condition.

In the search system, the user terminal 10 is a computing device used by a user who enters a search term. Like the search server 30, the user terminal 10 may be a notebook, a desktop, a laptop, or the like. However, the present invention is not limited thereto, and the user terminal 10 may include any apparatus equipped with computing means and communication means. The user terminal 10 will be described in detail below with reference to FIG. 2.

In the search system, the user terminal 10 and the search server 30 may communicate with each other over a network 20. Here, the network may be achieved by any kind of wired/wireless networks such as a local area network (LAN), a wide area network (WAN), a mobile radio communication network, wireless broadband Internet (WiBro), etc.

The configuration of the search system according to this embodiment has been described with reference to FIG. 1. Next, the operation of the search system will be briefly described with reference to FIG. 2.

First, the primary search condition (search term) of the user terminal 10 is input. A conventional search system performs a search according to the primary search condition, shows a search result screen, and then responds to a separate input. However, according to an embodiment of the present invention, a first user input may be detected for the primary search condition (search term).

The first user input indicates a user input other than a user input for editing the search term. The first user input is entered to the user terminal 10 through an input device capable of pointing in the user terminal 10. The input device capable of pointing may be, for example, a touchpad, a touch display, a mouse, a stylus pen, an eye tracking apparatus, or the like.

For example, the first user input of the user terminal 10 may be a user input being maintained for a pre-specified time or more, such as a long tap, a multi-touch, or a long left-button click with respect to an editing range where the search term is to be input.

The user terminal 10 transmits the input search term to the search server 30 in response to the first user input.

When the search term is received, the search server 30 performs a search using the search term, analyzes a result of the search, and defines a search result screen configuration scheme to be applied to the search term. The search result screen configuration scheme may be defined as one or more entries and an item for each of the entries.

The search server 30 transmits a result of defining the search result screen configuration scheme to the user terminal 10. The user terminal 10 receives the definition result, renders a first GUI object for receiving the search result screen configuration scheme, and then displays the rendered first GUI object. It is preferable that the first GUI object should be displayed adjacent to a search term input region.

A user may confirm that the first GUI object is newly displayed only by entering the first user input to the user terminal 10. That is, it should be noted that no additional user input is required to display the first GUI object after the first user input.

The user enters a second user input for configuring a desired search result screen through the first GUI object to the user terminal 10 through the first GUI object. When the second user input is entered, the user terminal 10 transmits a search result screen configuration scheme corresponding to the second user input to the search server 30. The second user input may be sequentially entered without releasing the first user input. For example, when the first user input is a press and hold of a specific portion of the stylus pen, the second user input may be a hold and drag.

The search server 30 receives the search result screen configuration scheme, re-configures a search result screen corresponding to the search term, and transmits, to the user terminal 10, search result data enabling the re-configured search result screen to be rendered to the display of the user terminal 10. The user terminal 10 receives the search result data and displays the re-configured search result screen.

According to the method described above with reference to FIG. 2, a user can enter a search term and then define a search result screen configuration scheme corresponding to the search term with minimal manipulation, that is, only by sequentially entering the first user input and the second user input.

The search method performed by the user terminal 10 may be more clearly understood by some embodiments of the present invention which will be described below with reference to FIGS. 3 to 13.

Figure 3:
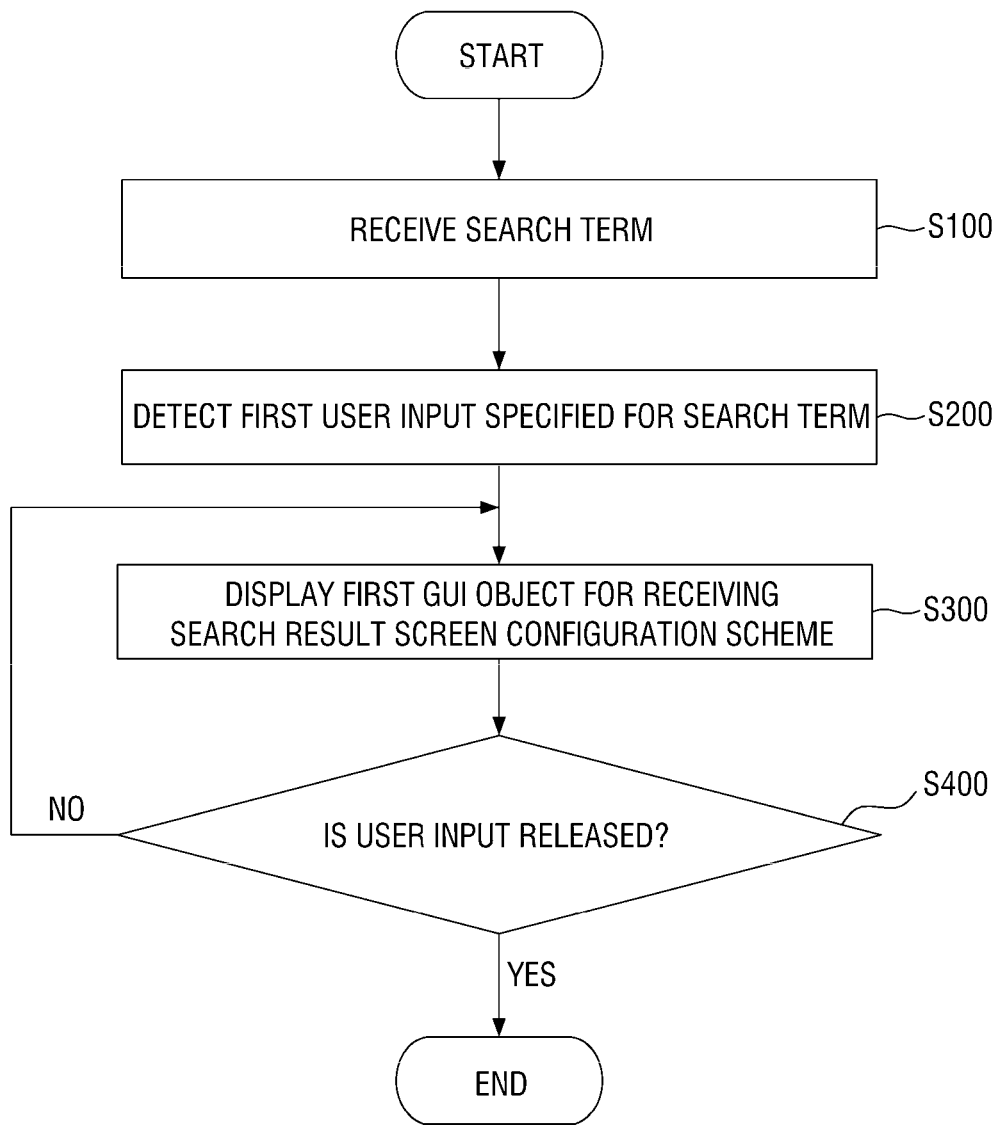
FIG. 3 is a flowchart illustrating a search method according to another embodiment of the present invention.

FIG. 3 is a flowchart illustrating a search method according to another embodiment of the present invention.

The method according to this embodiment is performed by a computing device. Physically, all operations included in the method of this embodiment may be executed by one computing device. Alternatively, first operations of the method of this embodiment may be performed by a first computing device, and second operations of the method of this embodiment may be performed by a second computing device. Each operation of this embodiment will be described below. When the subject of each operation is omitted, the subject may be the computing device.

Figure 4:
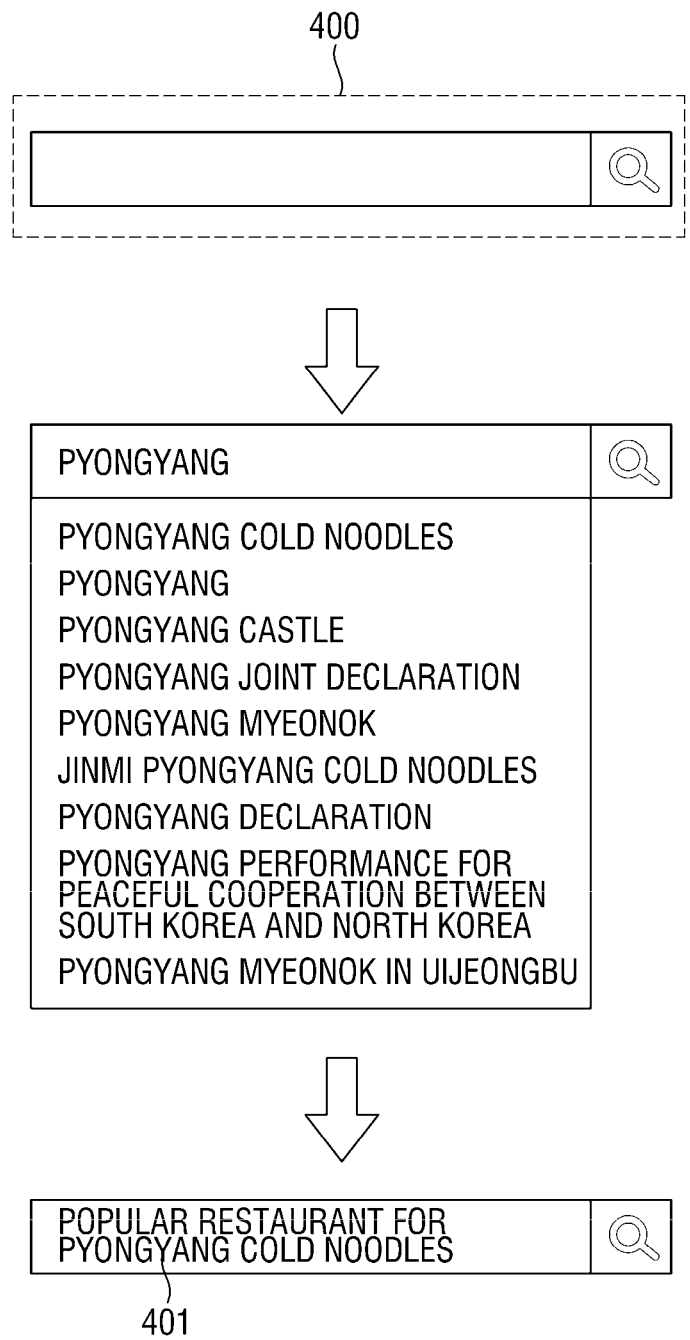
FIGS. 4 to 7 are example diagrams of a screen to be displayed according to the method that will be described with reference to FIG. 3.

In S100, a search term is input. The search term is shown as an example of the primary condition. Referring to FIG. 4, a search window 400 is displayed on the user terminal 10. The user may enter a keyword or the like as the search term 401, which is the primary search condition. In this case, as shown in FIG. 4, a context may be recommended when the search term is being entered. The user may complete the search term by selecting the recommended context or by directly entering the search term.

Returning to FIG. 3, a first user input may be detected from the search term in S200. The first user input refers to a user input other than a user input for editing the search term. In S300, a first graphic user interface (GUI) object for receiving a search result screen configuration scheme is displayed in response to the detection of the first user input. In this case, an entry for configuring the first GUI object and an item for the entry may be determined on the basis of the primary search result. This will be described with reference to FIG. 5.

Figure 5:
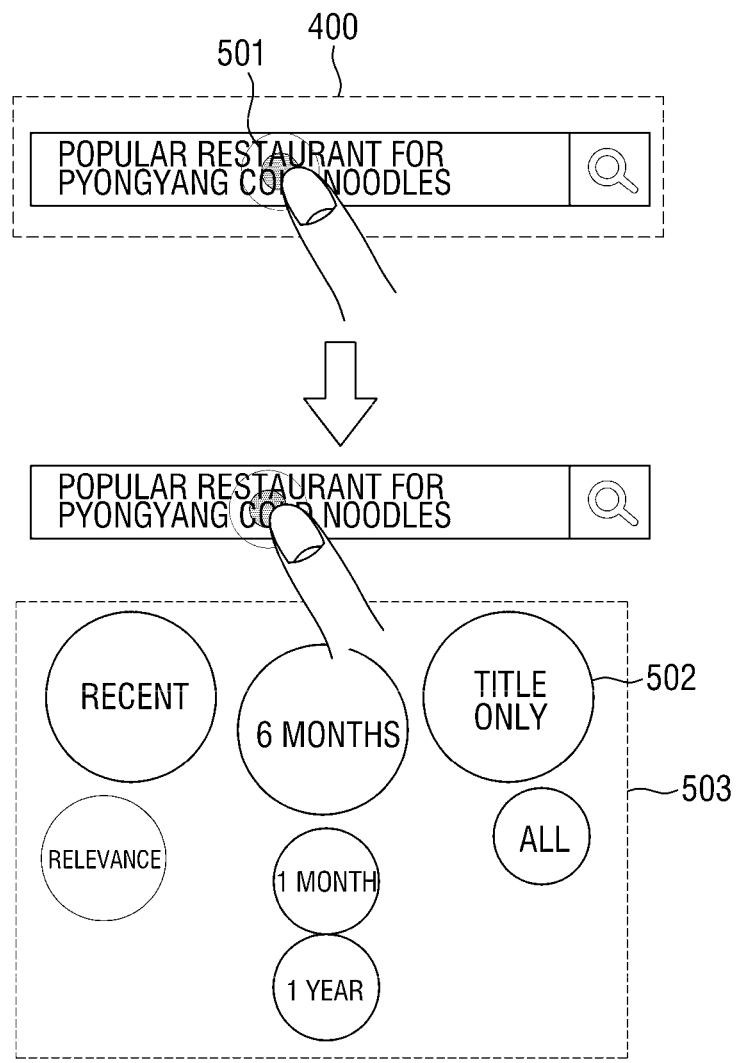

In FIG. 5, a long press is shown as an example of the first user input. Referring to FIG. 5, a long press 501 is detected for the completed keyword as the first user input. In this case, the detected region is not limited to the completed keyword and may be set as the region of the search window 400.

When the long press 501 is detected, a first GUI object 503 is displayed. The first GUI object is composed of one or more items 502. The items indicate detailed conditions such as a category, entry, and the like. For example, when the long press 501 is applied to a search window 400 named "popular restaurant for Pyongyang cold noodles," "recent" indicating a sorting criterion, "six months," "one month," and "one year" indicating relevance and a period, "title only" and "all" indicating a range, and the like are displayed as the items 502. Objects indicating the items 502 shown in FIG. 5 have a circular shape. However, this is only an example, and the present invention is not limited thereto.

Also, the GUI items indicating the items 502 may be rendered in the form of a floating button. However, the present invention is not limited thereto.

The objects indicating the items 502 constituting the first GUI object may or may not be based on a search term. First, the case based on a search term will be described with reference to FIG. 6.

Figure 6:
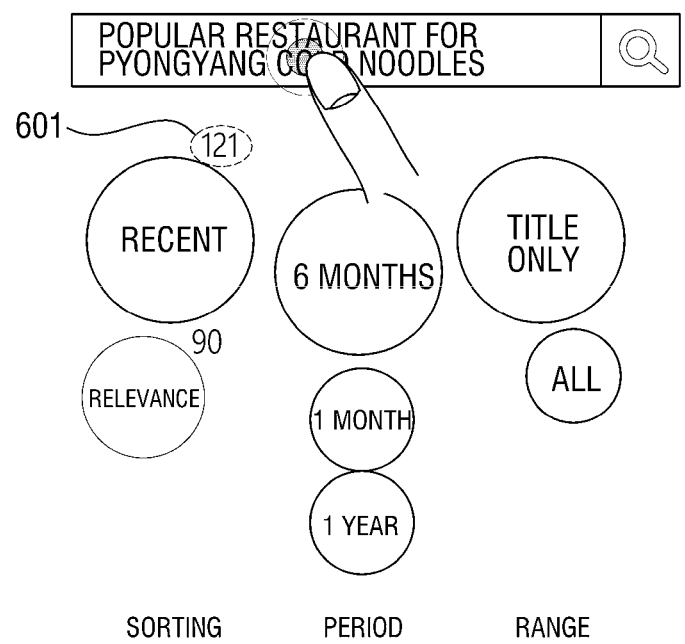

FIG. 6 is a diagram in which the first GUI object is displayed by entering "popular restaurant for Pyongyang cold noodles" and then applying a long touch. In this case, a primary search is performed under the primary search condition "popular restaurant for Pyongyang cold noodles."

The primary search may be performed through a user terminal or through a search server. When the primary search is performed through a search server, the search server 30 transmits a result of defining the search result screen configuration scheme to the user terminal 10. The user terminal 10 receives the definition result, renders a first GUI object for receiving the search result screen configuration scheme, and then displays the rendered first GUI object. It is preferable that the first GUI object should be displayed adjacent to a search term input region.

In this case, numerical information indicating at least one of the number of searches for each entry and the number of searches for each item of the primary search result may be further displayed adjacent to the first GUI object.

For example, referring to FIG. 6, the number of searches for each of the items 502 is displayed adjacent to the corresponding item 502 as a number guide 601 on the basis of the primary search result. That is, when a search is executed using "popular restaurant for Pyongyang cold noodles," the number of searches corresponding to recent items is 121, and the number of searches corresponding to relevant items is 90. A user may discern the number of searches for each item using the number guide 601 without a separate additional input. In addition, the user may discern the number of searches for each item without screen switching and may instantly reflect the number of searches in a desired search result configuration screen.

As another example of the first GUI object configuring method, there is a method of configuring the first GUI object on the basis of the usage frequency of the user. The user stores a secondary selection result that has frequently been selected and configures the first GUI object on the basis of the secondary selection result. Alternatively, the user of the computing device may differentially display the first GUI object on the basis of the category of a hit item selected from a search result screen. In this case, the search result screen refers to all search result screens displayed using the computing device as well as a search result screen by the search methods according to some embodiments of the present invention.

The method of configuring the first GUI object on the basis of the usage frequency of the user may be implemented by the user terminal 10 analyzing the user's previous search history or the like, providing information regarding the user's search tendency, and providing a search condition for the search result screen configuration scheme on the basis of the provided search tendency information.

In this case, depending on the embodiment, the search tendency information may be implemented by providing the information analyzed by the search server 30 to the user terminal 10 or by directly performing the analysis through the user terminal 10. The information may be implemented in any form. This will be described below with reference to FIG. 7.

Figure 7:
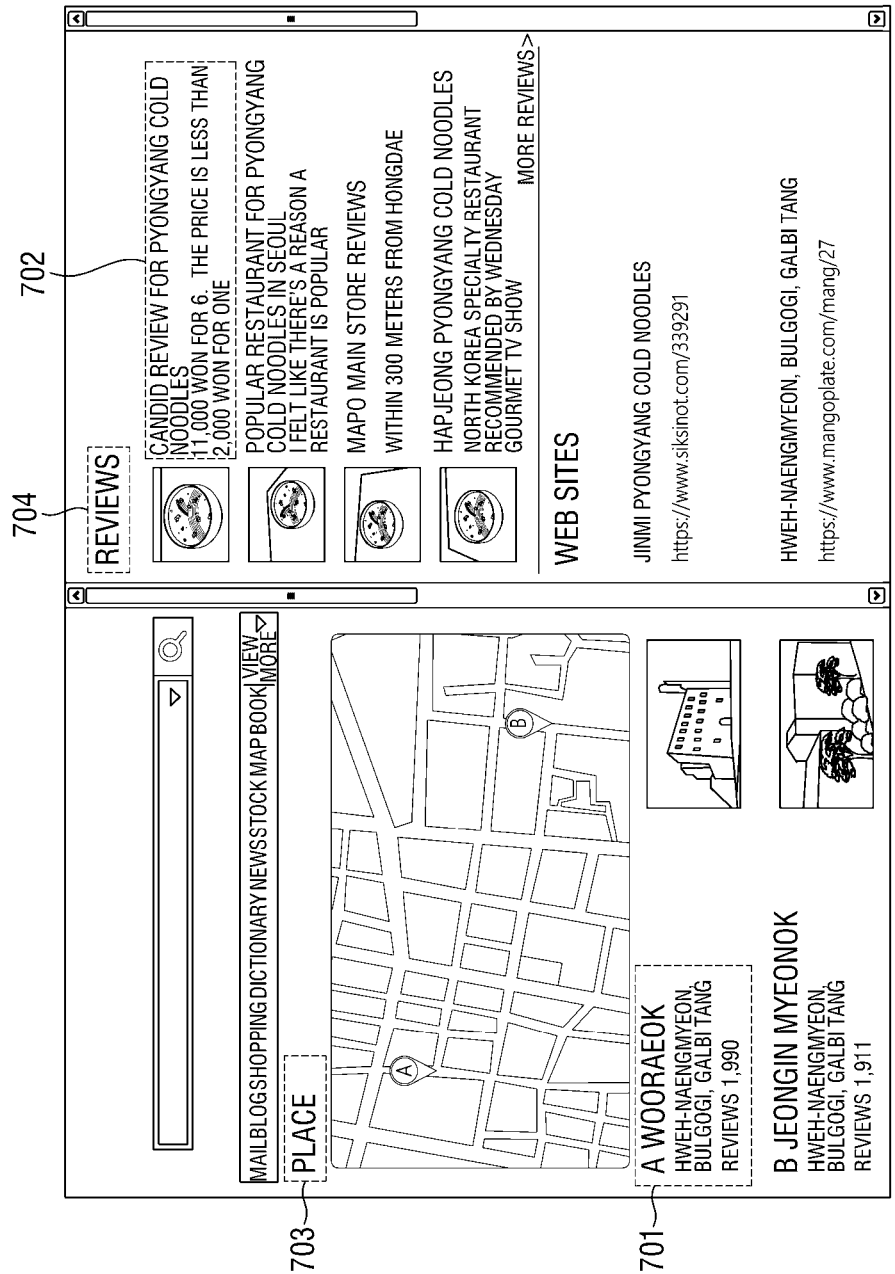

FIG. 7 shows a search result screen obtained by searching for popular restaurants for Pyongyang cold noodles using a search web service. Here, as a result of analyzing the user's search tendency, it is assumed that the user has frequently searched for Wooraeok 701 and blog reviews 702. In this case, a place 703 and a review 704 corresponding to the categories of Wooraeok 701 and blog reviews 702 may be displayed differentially such that they are highlighted in comparison to other items.

As an example of the differential displaying, the first GUI object may be configured such that item objects indicating the place 703 and the review 704 are highlighted in comparison to other item objects by the item objects being placed above the other item objects, the item objects being represented in a larger size than those of the other item objects, or the item objects being represented in a different color from those of the other item objects.

The user can easily and quickly configure the search result screen according to his or her search tendency without separate input or screen switching.

According to still another embodiment, the first GUI object displayed in response to the first user input may not be based on a search term. In this case, items 502 to be included in the first GUI object may be determined through setting. The setting may be pre-performed by the user or by a search service provider.

Figure 8:
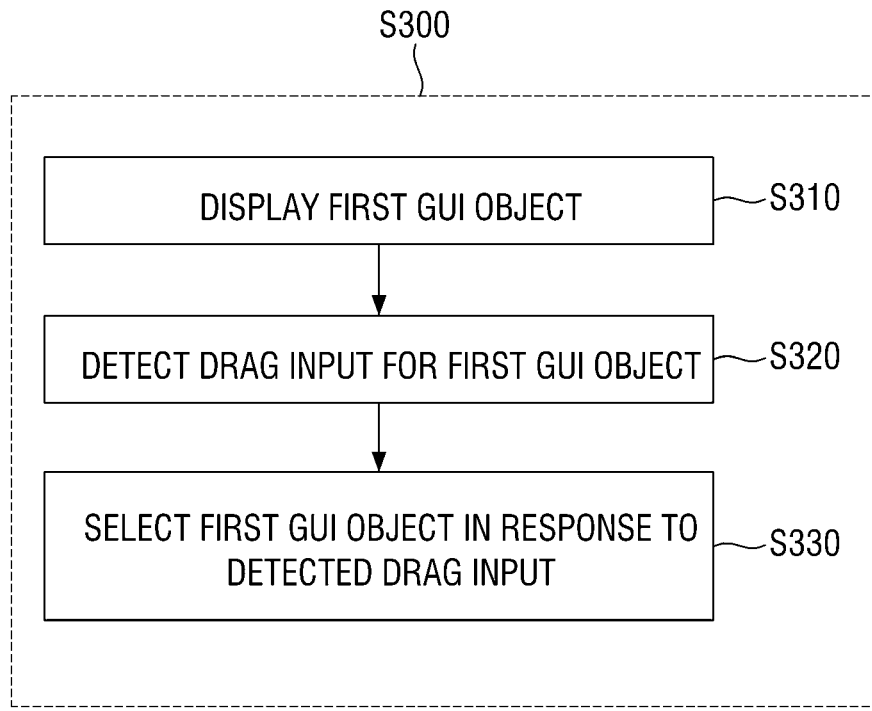
FIG. 8 is a flowchart illustrating a method of displaying a first graphic user interface (GUI) object for receiving a search result screen configuration scheme according to the method that will be described with reference to FIG. 3.

FIG. 8 is a flowchart illustrating a method of displaying a first GUI object for receiving a search result screen configuration scheme according to the method that has been described with reference to FIG. 3.

Figure 9:
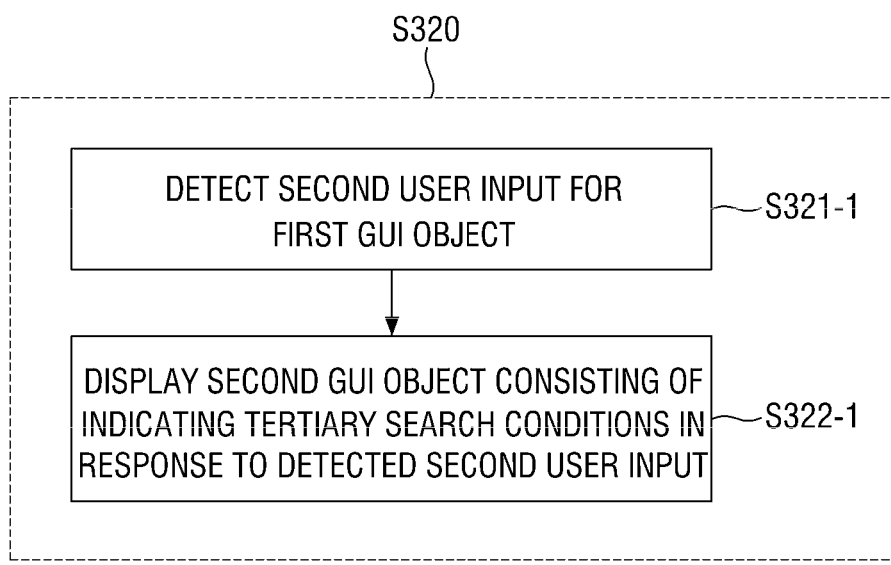
FIG. 9 is a flowchart illustrating a method of detecting a drag input on the first GUI object to be described with reference to FIG. 8.

In S310, a first GUI object is displayed. In S320, a drag input for the first GUI object is detected. In this case, a second user input refers to a pre-specified input capable of being performed while the first user input is maintained. For example, when the first user input is a long press, dragging a corresponding item repeatedly and alternately left and right while maintaining the long press may be specified as the second user input. This will be described below with reference to FIG. 9. FIG. 9 is a flowchart illustrating a drag input detection method for the first GUI object.

First, in S321-1, a second user input for the first GUI object is detected. In S322-1, a second GUI object consisting of an item indicating a tertiary search condition is displayed in response to the second user input. This will be described in detail with reference to FIGS. 10A and 10B.

Figure 10A:
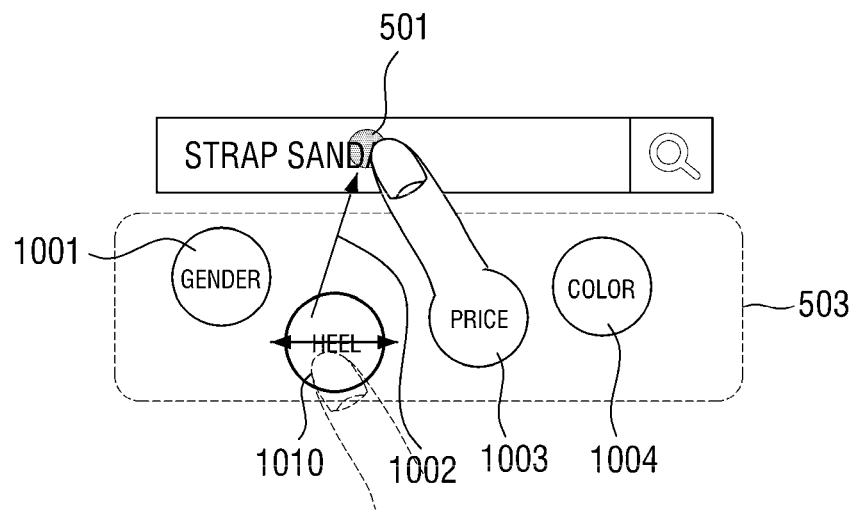
FIGS. 10A and 10B are example diagrams of a screen where the first GUI object for receiving a search result screen configuration scheme is displayed according to the method which will be described with reference to FIGS. 8 and 9.

Referring to FIG. 10A, "strap sandal" is entered as a search term. Also, a long press 501 for "strap sandal" is detected as the first user input. The first GUI object 503 is displayed in response to the detected long press 501. That is, the first GUI object is displayed without any additional user input after the first user input for "strap sandal."

Referring to FIG. 10A in detail, the first GUI object 503 includes a plurality of items indicating gender 1001, heel 1002, price 1003, and color 1004. In this case, the user may select only some sub-concepts of the heel 1010 to configure the search result screen. When it is assumed that the second user input indicates dragging on the item repeatedly and alternately left and right, the user may drag on an item 1002 indicating the heel repeatedly and alternately left and right while maintaining the long press 501.

Figure 10B:
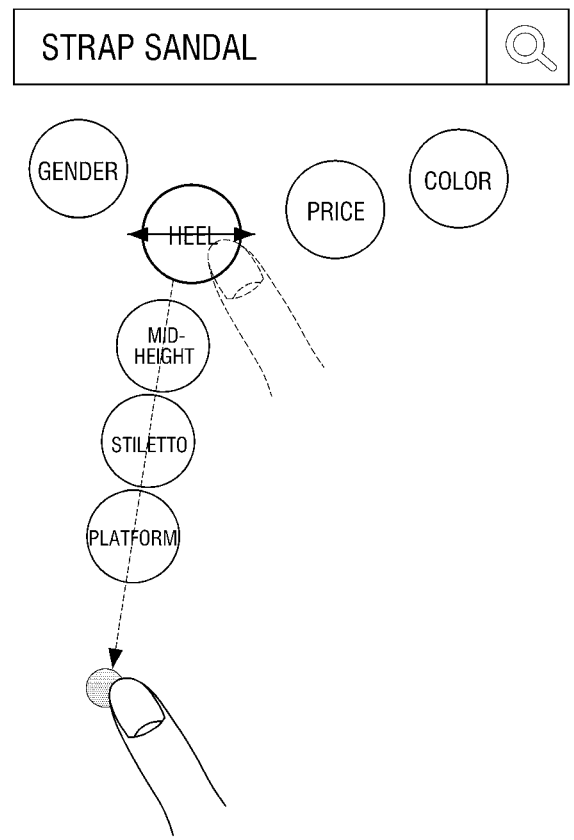

FIG. 10B shows a screen displayed in response to the second user input. That is, "mid-height," "stiletto," "platform," and the like, which are sub-concepts of the heel are displayed as the second GUI objects in response to the input of dragging repeatedly or alternately left and right. When more various second GUI objects are desired to be checked by the user, a drag input may be applied along the direction of the displayed second GUI object. It will be appreciated that this is exemplary, and various gestures may be specified as the second user input. Through the function, the user can easily view desired details without separate screen switching.

Returning to FIG. 8, the first GUI object is selected in response to the drag input detected in S330. This will be described with reference to FIGS. 11 to 13.

Figure 11:
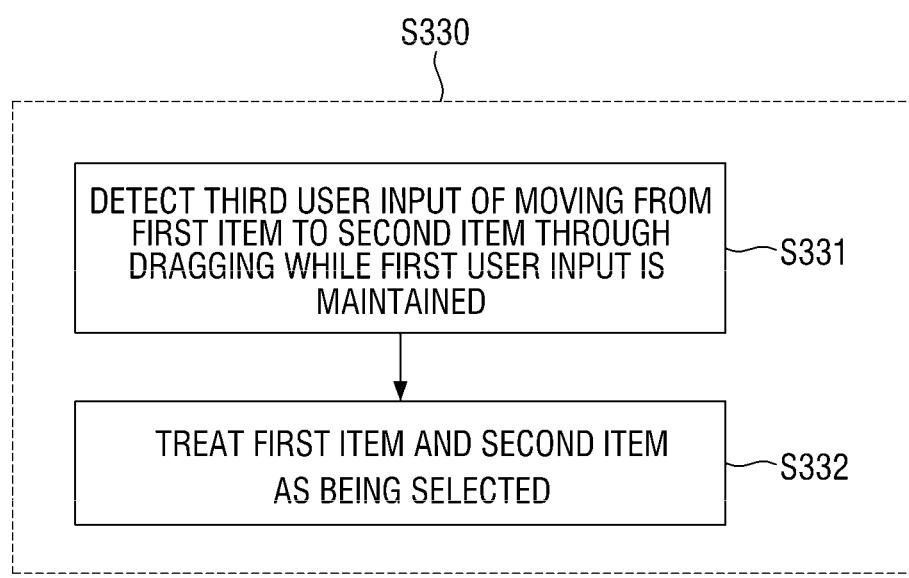
FIG. 11 is a flowchart illustrating a method of selecting the first GUI object in response to the detected drag input according to the method which will be described.

FIG. 11 is a flowchart illustrating that the first GUI object is selected in response to the detected drag input, which are referenced in some embodiments.

First, in S331, a third user input for moving from a first item to a second item through dragging while the first user input is maintained is detected. Subsequently, in S332, the third user input is treated as a selection of the first item and the second item.

Figure 12A:
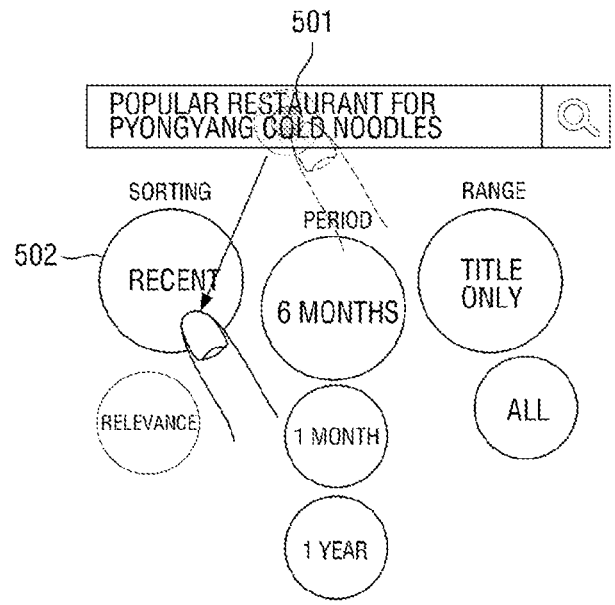
FIGS. 12A to 13 are example diagrams of a screen to be displayed according to the method that will be described with reference to FIG. 11.
Figure 12B:
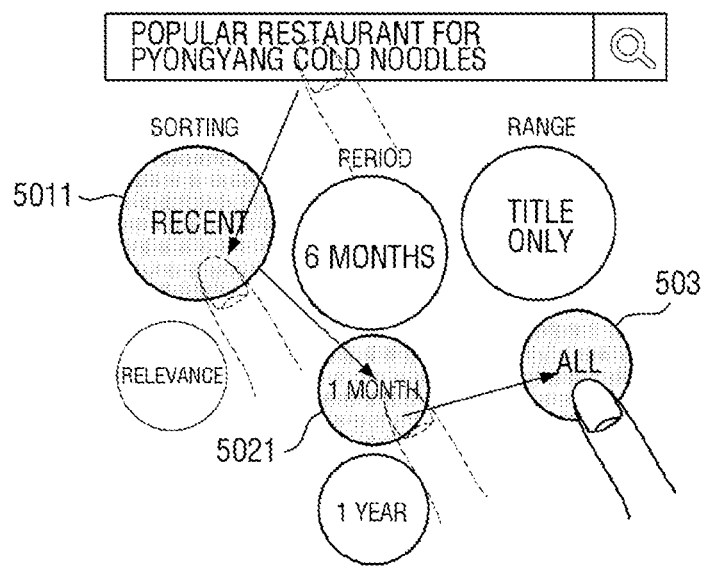

Some embodiments for selecting a GUI object in response to a detected drag input will be described below with reference to FIGS. 12A and 12B. FIGS. 12A and 12B show some regions of an example screen to be displayed on the user terminal 10 before and after a third user input.

The third user input refers to a user input that is applied while the first user input other than the user input for editing the search term is maintained.

First, FIG. 12A shows that the first GUI object is displayed by entering "Pyongyang cold noodles" as a search term and then applying a long press 501 as the first user input. Like FIG. 5, the first GUI object consists of items. By applying the long press 501 to the search window 400 named "Pyeongyang cold noodle restaurant," "recent" indicating a sorting criterion, "six months," "one month," and "one year" indicating relevance and a period, "title only" and "all" indicating a range, and the like are displayed as the items.

Also, a screen is displayed in which an item 501 indicating "recent" included in the displayed first GUI object is selected through the third user input after movement to the item 501 indicating "recent" through a drag input while the long press input is maintained.

Referring to FIG. 12A, an item indicating "recent" is selected in response to the third user input after movement to the item indicating "recent" through dragging while the long press 501 is maintained. Also, according to some embodiments of the present invention, the item selection is possible for a plurality of items. This will be described with reference to FIG. 12B.

Referring to FIG. 12B, the item 5011 indicating "recent" is selected, and an item 5021 indicating "one month" and an item 503 indicating "all" are sequentially selected through a third user input after dragging movement. In FIG. 12B, a selected item is displayed in a different color from those of unselected items and thus is distinguished from the unselected items. This is merely an example for differentiation, and it will be appreciated that it may be displayed that the selection is made by various other methods.

That is, all operations to be performed from when the first GUI object forming the search result screen is displayed to when an item indicating a desired search condition is selected after a user enters a search term may be done at once without separate screen switching.

Figure 13:
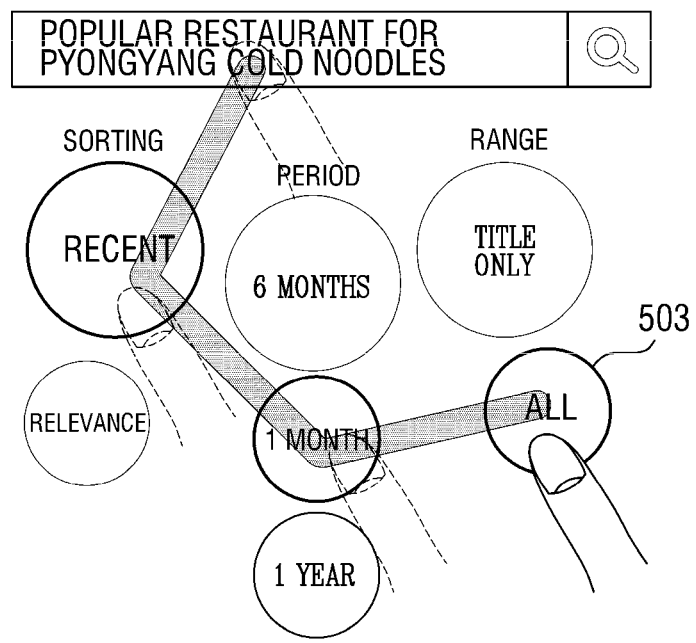

In addition, referring to FIG. 13, a dragging line may also be displayed. This is to give a visual effect to a user selecting an item.

Returning to FIG. 3, in S400, it is determined whether a first user input is released. When the first user input is released, a search result screen configured to reflect the selected item is displayed. For example, when the first user input is a long press, a search result screen reflecting the selected item may be configured and displayed as soon as the user stops entering the long press.

That is, a search result screen set up to a tertiary search condition is configured and displayed without separate screen switching. Also, when the first user input is a long press, all operations are possible with one hand. Accordingly, in the case of a search using a mobile terminal such as a smartphone, it is possible to maximize user convenience.

A search apparatus according to still another embodiment of the present invention will be described in detail below with reference to FIG. 14. It should be noted that the search apparatus according to this embodiment may be implemented using one physical computing device or may be implemented using a plurality of different physical computing devices.

Figure 14:
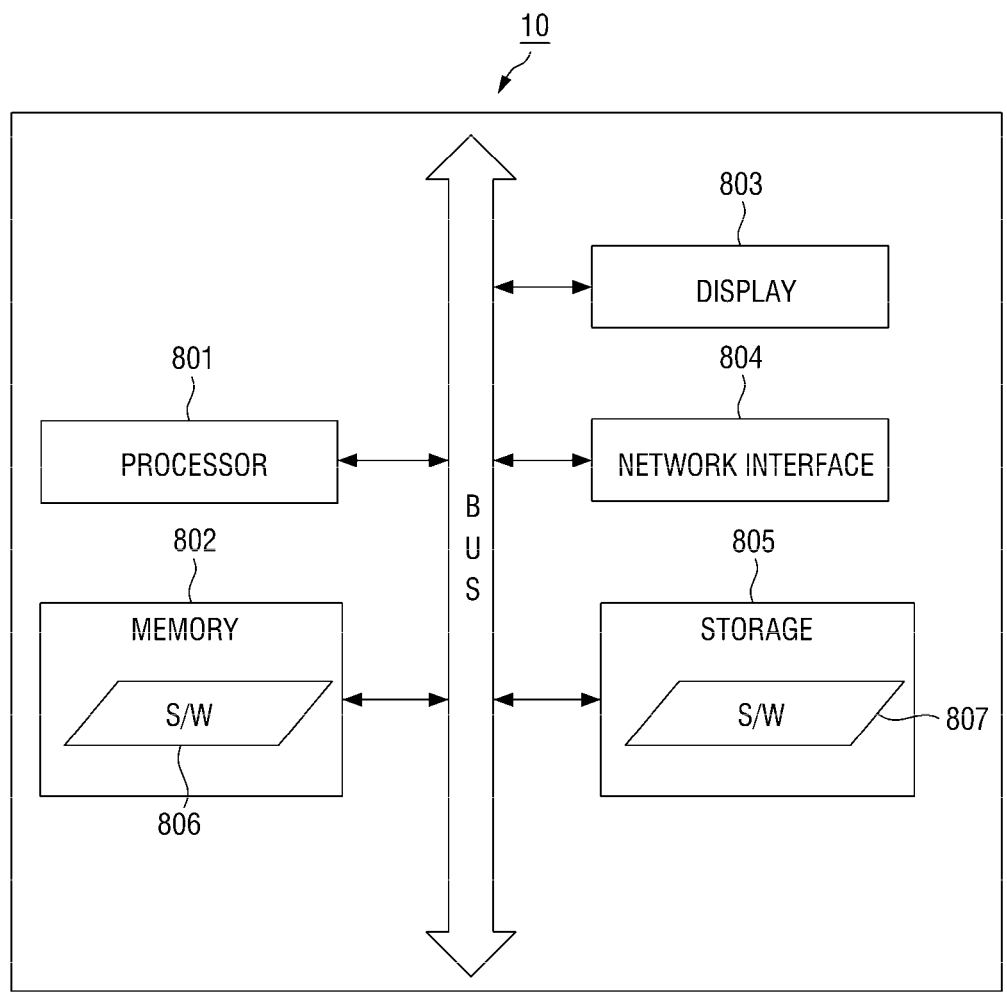
FIG. 14 is a hardware block diagram of a search apparatus according to still another embodiment of the present invention.

Referring to FIG. 14, the user terminal 10 may include a processor 801, a memory 802, a display 803, a network interface 804, and a storage 805. Also, although not shown, the user terminal 10 may include an input unit (not shown) for receiving various inputs from a user.

The processor 801 controls overall operation of each element of the user terminal 10. The processor 801 may include a central processing unit (CPU), a microprocessor unit (MPU), a microcontroller unit (MCU), or any processor well-known in the technical field of the present invention. Further, the processor 801 may perform an operation for at least one application or program to implement the method according to the embodiments of the present invention. The user terminal 10 may have one or more processors.

The memory 802 stores various kinds of data, commands, and/or information. The memory 802 may load one or more programs 806 from the storage 805 to implement a search method of an interface according to embodiments of the present invention.

The display 803 may have an output module configured to display a GUI. The display device may provide various information by displaying various user interfaces (UIs) in response to an input applied onto the GUI.

Also, the display 803 may receive a user input for controlling a user terminal. In some embodiments, the input unit may receive a user input through an input device. For example, the input unit may receive a user input through a separate input device such as a mouse, a keyboard, a tablet, and a stylus pen or through a display device equipped with a touchscreen. When the display device is equipped with a touchscreen, the user input may be made by directly applying an input to the touchscreen.

However, in some embodiments, the user terminal 10 may not include the display device. In this case, the user terminal 10 may include a display adaptor (not shown). When the user terminal 10 includes a display adaptor (not shown), the user terminal 10 may receive a user input through a separate display device connected through the display adaptor.

The network interface 804 supports wired or wireless Internet communication of the user terminal 10. Also, the network interface 804 may support various communication methods in addition to Internet communication. To this end, the network interface 804 may include various kinds of communication modules.

The storage 805 may non-temporarily store data or the like received from an external device. The storage 805 may include a nonvolatile memory such as a read only memory (ROM), an erasable programmable ROM (EPROM), an electrically erasable programmable ROM (EEPROM), a flash memory, etc., a hard disk drive, a detachable disk drive, or any computer-readable recording medium well known in the art.

The storage 805 may store one or more programs 807 for performing the method according to the embodiments of the present invention. FIG. 3 shows software executing the search method as an example of the program 806. A first GUI object for receiving a search result screen configuration scheme may be automatically displayed in response to a first user input for a search term received through the software without an additional user input after the first user input. Also, input details and various setting details entered from the user of the user terminal 10 may be stored in the storage 805.

The methods according to embodiments of the present invention that have been described may be performed by executing a computer program embodied in computer-readable code. The computer program may be transmitted from a first computing device to a second computing device via a network, such as the Internet, and may be installed in and used by the second computing device. The first computing device and the second computing device include a server apparatus, a physical server belonging to a server pool for a cloud service, and a stationary computing device such as a desktop personal computer (PC).

The computer program may be stored in a recording medium such as a digital versatile disc-read only memory (DVD-ROM), a flash memory device, or the like.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A search method performed by a user terminal and a search server, the search method comprising:
   receiving a search term entered in a search window of the user terminal and a first user input for the received search term;
   transmitting the input search term to the search server in response to the first user input;
   performing, by the search server, a search using the received search term, analyzing a result of the search, and defining a search result screen configuration scheme to be applied to the search term, wherein the search result screen configuration scheme is defined as one or more entries and an item for each of the one or more entries;
   transmitting the search result screen configuration scheme to the user terminal;
   receiving the search result screen configuration scheme by the user terminal and automatically rendering a first GUI object for receiving the search result screen configuration scheme without an additional user input after the first user input; and
   displaying a search result searched using a search condition selected through the first GUI object and the received search term,
   wherein the first user input is a user input other than a user input editing the search term;
   the first GUI object comprises items each of which indicates the search condition and is displayed outside the search window, and the items comprises a first item, a second item, and a third item;
   wherein, in response to a user input of dragging from the first item to the second item and subsequently dragging the second item to the third item while the first user input is maintained, the search result searched using the received search term, the first search condition corresponding to the first item, the second search condition corresponding to the second item, and the third search condition corresponding to the third item is displayed; and
   the search result is not displayed when dragging from the first item to the second item.

2. The search method of claim 1, wherein the displaying of the first GUI object comprises obtaining a primary search result for the search term in response to the first user input and determining an entry for configuring the first GUI object and an item for the entry on the basis of the primary search result; and
   the primary search result is not displayed.

3. The search method of claim 2, further comprising:
   detecting a second user input for the first GUI object, the second user input sequentially entered without releasing the first user input;
   transmitting a search result screen configuration scheme corresponding to the second user input to the search server; and
   additionally displaying a second GUI object configured to receive the search result screen configuration scheme in detail in response to the detected second user input.

4. The search method of claim 2, wherein the displaying of the first GUI object further comprises further displaying, adjacent to the displayed first GUI object, numerical information indicating at least one of the number of searches for each entry and the number of searches for each item of the primary search result.

5. The search method of claim 1, wherein the items of the first GUI object comprise items which indicate the first or second search condition of a category or an entry;
   the first user input is a long tap or a long left-button click; and
   the search method further comprises treating the first item as being selected when a second user input of moving to the first item through dragging while the first user input is maintained is detected.

6. The search method of claim 5, further comprising automatically displaying a search result screen configured to reflect the first item without an additional user input after release of the first user input in response to the release of the first user input.

7. The search method of claim 5, wherein the treating of the first item as being selected comprises treating the first item and a third item as being selected in response to a third user input of moving from the first item to the third item through dragging while the first user input is maintained.

8. The search method of claim 1, wherein the items of the first GUI object comprise an item pre-defined irrespective of the received search term.

9. The search method of claim 1, wherein the items of the first GUI object comprise items which indicate the first or second search condition of a category or an entry; and
   each of the items is displayed differentially from each other on the basis of a history of a user's selection of the items.

10. The search method of claim 1, wherein the items of the first GUI object are configured to define a search result screen; and
    the items constituting the first GUI object are items selected from among a plurality of candidate items on the basis of a history of a user's selection of the items.

11. A computing device comprising:
    an input device configured to receive a user input;
    a network interface configured to transmit a search request including a search term to a search server;
    a memory configured to load a plurality of instructions; and
    a processor configured to execute the plurality of instructions loaded in the memory,
    wherein:
    the plurality of instructions for performing operations comprising:
    receiving a search result screen configuration scheme and automatically rendering a first GUI object for receiving the search result screen configuration scheme without an additional user input after the first user input, and display a search result searched using a search condition selected through the first GUI object and the received search term, wherein the search result screen configuration scheme is defined by the search server which performs a search using the search term transmitted from the input device and analyzes a result of the search, and defining a search result screen configuration scheme, wherein the search result screen configuration scheme is defined as one or more entries and an item for each of the one or more entries, and the first user input is a user input other than a user input editing the search term, and wherein the first GUI object comprises items each of which indicates the search condition and is displayed outside the search window, the items comprising a first item, a second item and a third item;

in response to a user input of dragging from the first item to the second item and subsequently dragging the second item to the third item while the first user input is maintained, the search result searched using the received search term, the first search condition corresponding to the first item, the second search condition corresponding to the second item is displayed; and the search result is not displayed when dragging from the first item to the second item.

* * * * *